Feb. 23, 1932.  A. L. RAVEN  1,846,357
MOTION PICTURE SCREEN
Filed Jan. 4, 1928  2 Sheets-Sheet 1

INVENTOR
Albert L. Raven
BY
Pennie, Davis, Marvin and Edmonds
HIS ATTORNEYS

Feb. 23, 1932.   A. L. RAVEN   1,846,357
MOTION PICTURE SCREEN
Filed Jan. 4, 1928   2 Sheets-Sheet 2
Fig. 4,
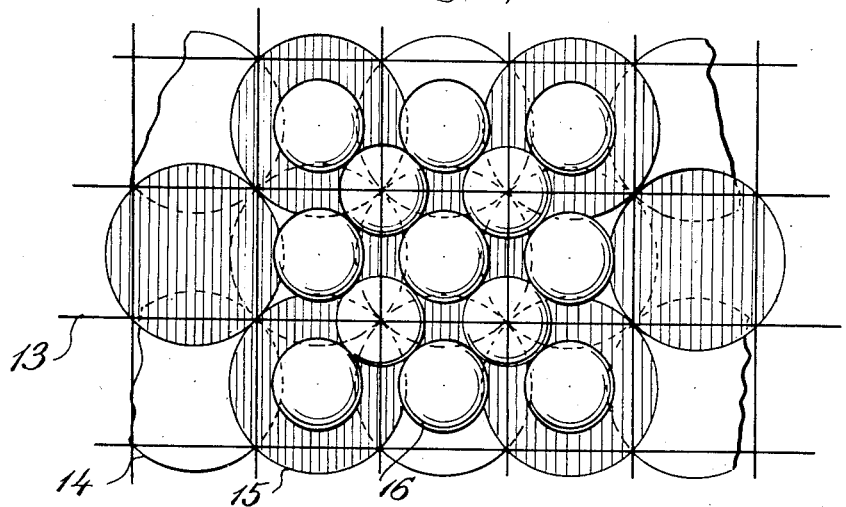
Fig. 5,
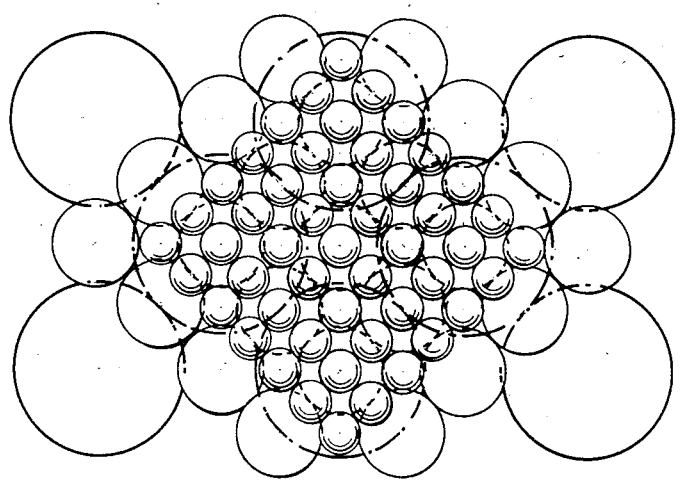
Fig. 6,
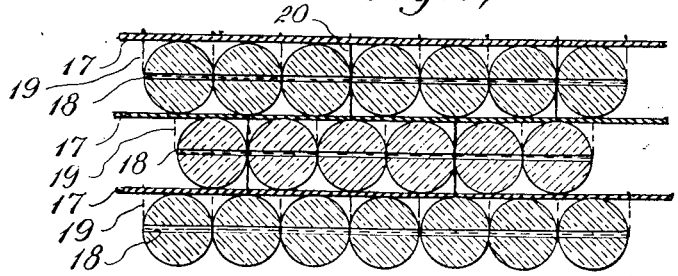
INVENTOR
Albert L. Raven
BY
Pennie Davis, Marvin & Edmonds
HIS ATTORNEYS Patented Feb. 23, 1932

1,846,357

UNITED STATES PATENT OFFICE

ALBERT LOUIS RAVEN, OF MOUNT VERNON, NEW YORK

MOTION PICTURE SCREEN

Application filed January 4, 1928. Serial No. 244,404.

This invention relates to curtains or screens for projected pictures and has for its object the provision of an improved screen for projected pictures as well as a method of manufacture thereof. More particularly, the invention aims to provide an improved screen which will not only reflect and diffuse or transmit and diffuse a large proportion of the light projected thereon, but at the same time will be of such construction that it will offer but slight resistance to the passage therethrough of sound waves, air or other gases of like nature.

In a heretofore customary manner of making reflecting motion picture screens the foundation or base of the screen is composed of some dense material preferably of such a nature that little if any light may be transmitted therethrough, the primary object being to obtain a front surface which will reflect towards the spectators a maximum quantity of light without the production of a glare as would be produced by a mirrored surface. Various means are utilized to attain this result, one way of attaining this is disclosed in my prior Patent No. 1,315,743, dated September 9, 1919. Various expedients are used to prevent the reflecting surfaces of these screens from all lying in the same plane, the object being to attain a diffusion of the reflected light.

A method which has been heretofore proposed to obtain a highly reflective surface comprises an opaque screen with a front surface composed of some highly refractive material. A layer of clear crystal glass beads is embedded within this front surface and held in position by adhesion in such a manner that substantially one half of the bead is embedded and one half is exposed above the existing surface. Each bead then acts as a tiny mirror with a spherical reflecting surface, the light being transmitted through the clear transparent glass to the back of the bead where it meets the reflecting surface and is reflected either back in the direction from whence it came or is reflected at an angle. Screens made in this manner are too directional, that is, they do not diffuse the light sufficiently, by far the greatest proportion of the light is reflected nearly in the direction from whence it came. Thus, to one located near the projection apparatus, the illumination is satisfactory, but to one remote from the line of the projected light the illumination is not satisfactory.

With the advent of talking motion pictures, such for example, as the Vitaphone, it has been found that when large screens are used with the sound producing horn placed at one side of the screen, the voice or music does not appear to emanate from the logical source of the sound, that is, the picture projected on the screen. This effect is particularly noticeable when an actor in a picture is speaking while in a position adjacent to one margin of the picture, while the horn of the Vitaphone is located near the opposite margin of the screen. This effect is not noticeable enough to be disturbing to those seated in the centre of the theatre and at a considerable distance from the screen. It, however, is very pronounced to one sitting at the side of the theatre at a considerable angle to the screen.

In order to overcome this defect it is necessary to replace the usual opaque screen with a porous cloth screen locating the Vitaphone speaker directly behind the screen. The porous nature of the cloth screen permits the passage therethrough of the sound waves and as a consequence the sound appears to emanate from the projected picture upon the screen. This method has the very serious defect that due to the porous translucent nature of the cloth screen a great portion (about 40%) of the light projected thereon passes through the screen and is lost, thus the illumination of the picture is proportionately re᎑ced. In order to compensate for this, it is proposed to increase the candle power of the projection apparatus. This, however, means a substantial increase in the current consumption which substantially increases the cost of operation of a small theatre where the Vitaphone is run continuously with the showing of the picture film. Increasing the candle power of the projection apparatus also increases the danger of burning or damaging the film as it passes through the projection machine.

In case the Vitaphone is only used occasionally and it is desired to save current, it would be necessary to use two screens of the type heretofore available.

I have discovered that a motion picture projection screen may be made which will either reflect or transmit and diffuse a large portion of the projected light and at the same time permit the free passage therethrough of air or like gases and air carried sound waves. In the practice of the invention the screen is built up of layers of opalescent or milk glass beads. The layers are suitably spaced from each other and the beads in each layer so positioned and secured that the beads of each succeeding layer are placed directly in front of the intersticial spaces between the beads in the layer directly behind. A sufficient number of layers is used so that there will be no direct passage through the screen for light rays from the projection apparatus. The intersticial spaces between the beads, however, permit the passage of air or air borne sound waves. When the screen is composed of three layers of beads the sound waves are able to find a passage through the screen by making one, or at the most two, turns or deviations from a straight course.

I have found it advantageous in forming the screen to use three layers of beads and to use a different sized bead for each layer. The largest beads are placed in the layer most remote from the spectators. The intermediate layer of beads is advantageously made up of beads substantially two thirds the diameter of the larger beads. The beads in the layer at the front of the screen, nearest the spectators, are substantially two thirds the diameter of the beads in the intermediate layer.

I have found it advantageous in forming the layers used in building up the bead screen to use beads not only of the conventional spherical shape but also for certain types of screens to use beads of other shapes. For certain types of screens where it is advantageous to reduce the thickness and/or weight of the screens, hemispherical beads are used. Flattened, ellipsoid or disc shaped beads are used in building up other screens to meet certain requirements. These wafers with convex surfaces do not diffuse the light so completely as the smaller spherical surfaces but they admit of building a much thinner screen and there is less loss of light by reflected light impinging on the back of the beads in the front layers.

When it is desired to place the projection apparatus behind the screen, that is, on the opposite side from that from which the spectators view the picture, it has been found advantageous to use beads of a more translucent nature. For this type of back projection the milkiness of the beads is reduced to such a point that a large proportion of the light is transmitted through the screen and diffused from the beads visible to the spectators in front of the screen. When using back or rear projection it has been found advantageous to reduce the milkiness of the beads to a point where they are actually transparent and with certain types of projection, particularly colored or tinted, a screen comprising clear transparent, crystal beads is advantageous.

The beads are formed into a screen and held in proper relatively spaced position in any appropriate manner. I have found it advantageous to support the various layers of beads upon wire mesh fabric carefully placing the beads in spaced or contacting relation to each other by permitting the beads to rest in the open meshes of the wire mesh fabric and being supported by the crossed wires thereof. The wire mesh fabric, during this operation, is stretched and supported in a horizontal position. A wire mesh fabric is selected of such a mesh that the beads will be supported by the crossed wires. The wires of the wire mesh fabric being close enough together so that the beads will not fall through.

Superimposed on this first layer of beads is placed another wire mesh fabric of smaller mesh. The beads placed on this second wire mesh fabric are smaller than those used in the first layer and are so placed on the meshes of the wire fabric that a bead is placed directly over each open space showing between beads of the first layer. Superimposed layers of beads are built up this way until a sufficient number of layers has been added to preclude the passage through the screen of a direct ray of light without the light striking a bead. When this stage has been reached, ordinarily with the placing of the third layer of beads, a final covering of wire mesh is put in place. This final covering of wire mesh fabric is preferably of the same mesh as the wire mesh fabric supporting the last layer of beads. The layers are then permanently secured together in any appropriate manner, as by means of tying together the two outer wire mesh fabrics at frequent intervals in both directions of the screen, that is, throughout the length and breadth of the screen. This formation of a unitary mass or screen may also be accomplished by stitching either by hand or by machine.

It is also contemplated to make use of ordinary textile fabrics in building up the bead screen of the invention. Beads with holes or perforations are usually used with this type of fabric. The beads are sewed in place on the fabric by means of textile threads or fine wire. One or more layers of beads may be sewed in place upon a single textile fabric backing or one or more layers of fabrics with attached beads may be superimposed and appropriately sewed together.

Various materials are available for the beads used in building up the screen of the invention. Glass beads prove most satisfactory where transparency or translucency is desirable but other materials are quite satisfactory for this type of bead. Bakelite, celluloid, cellulose acetate, casein and other plastic compositions of like nature furnish satisfactory beads for screens of this type. Beads of some of these materials may be formed directly in place upon the fabric and attached to the fabric by adhesion while still soft and plastic. Others of these composition beads may be suitably attached by appropriate solvents or mixtures of solvents and the material of which the beads are composed.

Opaque beads may be composed of a great variety of materials such for instance as the various metals and alloys. Ceramic materials in great variety are also available for the making of opaque beads. Ceramic materials may be made with both glazed and unglazed faces and are available in a great variety of colorings or blended effects which enhance the beauty of the reflected picture.

The practical operation and construction of a motion picture screen embodying the aforementioned principles underlying the present invention will be understood from the following description taken in conjunction with the accompanying drawings, the various views of which are greatly enlarged to depict more clearly the screen structures; in which, Fig. 1 is a top plan of three layers of the screen each shown separately;

Fig. 4 is a top diagrammatic representation of another three layer bead arrangement;

Fig. 5 is a top diagrammatic representation of still another three layer bead arrangement;

Fig. 6 is a sectional view of a bead screen built upon three layers of textile fabric.

Figure 1:
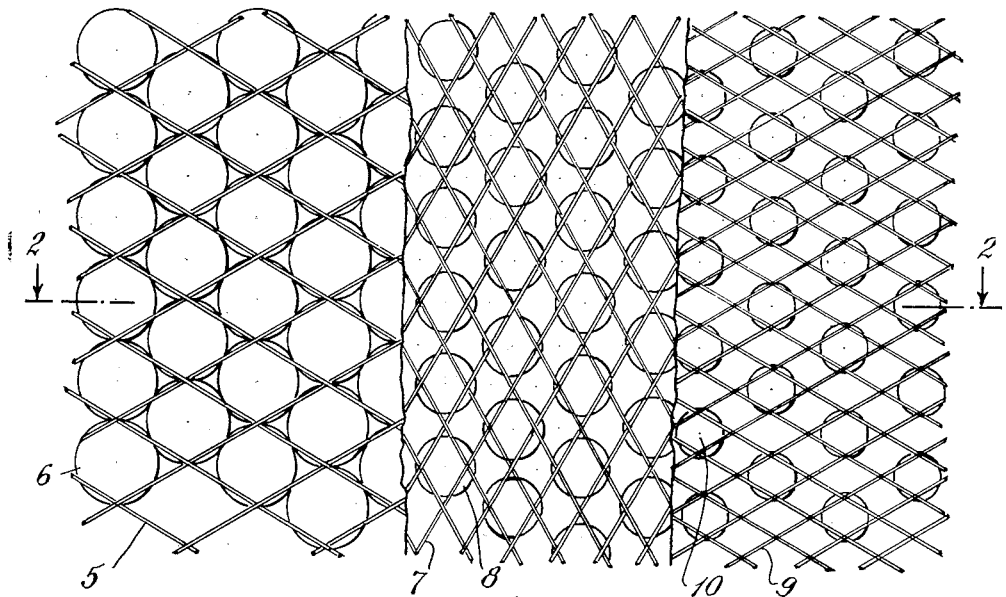
Figure 2:
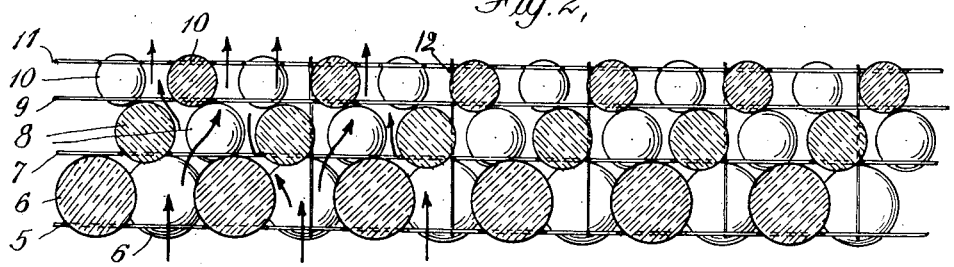
Fig. 2 is a sectional view of the screen with the same bead arrangement.
Figure 3:
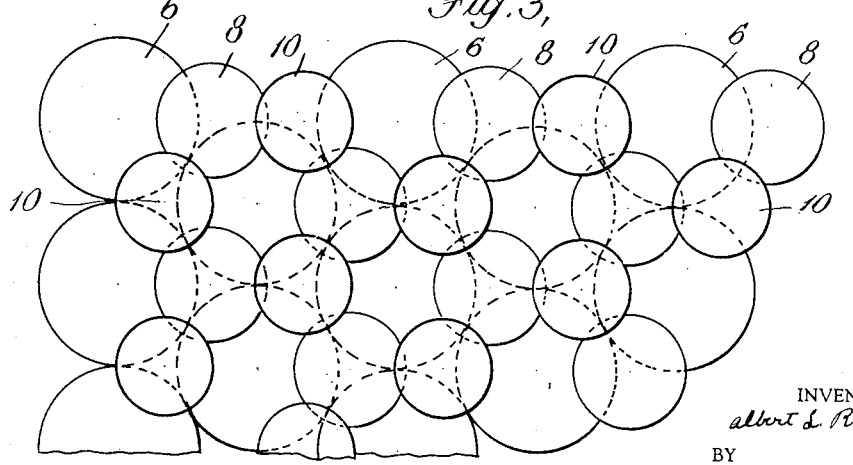
Fig. 3 is a top diagrammatic representation of the same bead arrangement.

The screen illustrated in Figs. 1, 2 and 3 comprises a wire mesh fabric 5 of diamond shaped meshes. The large sized beads 6 are supported in the diamond shaped interstices of the wire mesh fabric 5 by the intersecting wires thereof. The beads of intermediate size are supported in the diamond shaped interstices of the wire mesh fabric 7. The wire mesh fabric 7 and the beads 8 which it supports are superimposed on the layer of beads comprising the larger sized beads 6. The wire mesh fabric 9 is superimposed on the layer of intermediate sized beads 8 and supports in its interstices, by the crossed wires of the mesh, the layer of smallest sized beads 10. A final wire mesh fabric covering 11 of the same mesh as the wire mesh fabric 9 next below is then placed over the top or last layer of beads 10.

The various layers of beads and wire mesh are then suitably fastened together, as by securely tying the two outer wire mesh fabrics to each other at regularly spaced intervals by means of threads or wires 12. This tying together of the screen may be either done manually or by machine stitching. When the various layers are thus consolidated into a coherent unitary screen the screen may be lifted into the upright position in which it is intended to be used.

The screen diagrammatically illustrated in Fig. 4 comprises a wire mesh fabric 13 of square shaped meshes. Beads 14 of a diameter equal to the diagonal of the meshes of the wire mesh fabric 13 are placed in alternate squares in the wire mesh fabric. By this arrangement the beads lie in contacting relation to each other in diagonal rows upon the wire mesh fabric and in spaced relation to each other in rows parallel to wires of the fabric. A wire mesh fabric of the same size mesh is disposed directly over the first layer of beads in such a manner that the wires and openings are disposed directly over the wires and openings of the first wire mesh fabric. A similar layer of beads 15 is disposed on this second wire mesh fabric in such a manner that the openings left vacant in the first layer are filled with beads in the second layer. A third wire mesh screen of the same number of meshes is disposed over the second layer of beads and is appropriately attached by sewing or wiring to the lowest wire mesh fabric 13. The stitching attaching these layers of wire mesh fabric passes through the point at which the diagonal rows of beads contact. Superimposed upon the third wire mesh is a smaller wire mesh fabric with square meshes of half of the size of the wire mesh fabric previously used. Disposed upon alternate squares of this fabric are beads 16 of a diameter equal to the diagonal of the squares of the smaller wire mesh fabric. The beads in this third layer are so disposed that the centers of half of them are directly over the points of contact of the diagonal rows of beads in the lower layers. As a consequence of this arrangement, the points at which the lower meshes were stitched together are completely covered by the upper layer of smaller sized beads. A wire mesh fabric of the same mesh as that used under this last layer is disposed upon the surface of the smaller beads. These two wire mesh fabrics are then appropriately stitched together and the top unit appropriately attached to the lower two layers by stitching at suitable intervals.

The screen diagrammatically illustrated in Fig. 5 comprises three layers of beads disposed upon appropriate square wire mesh fabrics. The beads of each superimposed layer are one half size of the beads in the layer next below it. In each layer the beads are disposed in alternate meshes of the wire mesh fabric and the beads of each superimposing layer are disposed in such a manner that the open spaces left in the layer below it are suitably covered by the beads of the superimposing layer. The beads of each layer are substantially equal in diameter to the diagonal of the squares of the wire mesh fabric on which they are disposed. Each layer is appropriately covered with a wire mesh fabric and the three layers are appropriately sewed together in such a manner as to form a unitary screen with the beads of the smallest size on the spectator side of the screen.

The screen illustrated in Fig. 6 comprises three layers of textile fabric 17. Perforated beads are disposed on each layer of fabric in such a manner that the perforations 18 in the beads lie parallel to the textile fabric. The beads of each layer are appropriately fastened to the fabric by means of stitching 19 which passes through the fabric and through the perforations of the bead. The various layers of the composite screen are stitched together at appropriate intervals by threads or wires 20. The various layers of the screen are so disposed that beads of the superimposed layer lie directly in front of the stitching used to attach the lower fabrics one to another. The side of the screen which is exposed to the spectator is the layer of beads which is not covered by a textile fabric.

Although screens in accordance with the present invention may be made in the manner described, I do not wish to confine myself to these methods alone. Screens in accordance with the present invention may be made by stringing beads or similar round perforated articles onto long strings. These strings of beads or the like are then placed parallel and woven into a fabric. In the weaving process the strings of beads form the warp of the fabric and are stretched lengthwise in the loom to be crossed by a woof which consists of fine threads of sufficient strength to form the whole into a substantial fabric sufficiently strong for the purpose. Two or more of these fabrics may then be suitably sewed together so that there are substantially no direct passages therethrough for light and yet the finished screen is a foraminous structure through which air borne sound waves are readily transmitted.

Screens made in accordance with the invention may be thoroughly cleansed in any appropriate manner, as for instance, by washing, without in any manner damaging the screens or the reflecting surfaces. The pigments or substances of the heretofore customary screens are damaged by light, dust and washing. Their efficiency as reflectors of light is deteriorated by accumulations of dust or dirt and frequently by washing. Cleansing is an expensive operation and is only accomplished with great care by experts skilled in their trade.

The value of the screen as a motion picture screen will be understood from the foregoing description as well as its value in conjunction with the talking movies in the nature of the Vitaphone. When front projection is being used, that is when the projection apparatus is placed on the spectator side of the screen, the sound producing horn or instrument may be placed directly behind the screen, and approximately at its center. The sound from the horn will be transmitted directly through the interstices of the screen and will appear to the spectators to emanate from the projected picture appearing on the screen.

It is often necessary or advisable during the showing of a picture to use talking or singing actors frequently in great numbers. Frequently as high as one hundred and fifty voices have been used during the showing of a picture. The voices of these performers are often blurred by the opaque screen between them and the audience. To overcome this difficulty the performers are crowded over to the lateral edges of the opaque screen and their voices permitted to pass through thin curtains hung at the sides of the motion picture screen. Such a makeshift arrangement is unnecessary when using the screen of the invention. The singers may be disposed in an orderly grouping directly behind the porous screen and be invisible to the audience but their voices penetrate the screen without difficulty.

The quality of the picture being projected on and reflecting from the screen is equal to or better than the quality of the picture produced by the type of screen commonly in use at the present time. This is accomplished by reason of the fact that the surface of the screen visible to the spectator is composed of myriads of tiny curved surfaces of round objects which are highly reflective by nature and which due to their curved surfaces diffuse the light perfectly at every conceivable angle. Thus, although the visible surface is made up of almost a perfect reflecting medium there is almost a complete absence of glare and the projected picture will be equally distinct when viewed from almost any angle. There is some absorption of light in the beads of the screen, but this is no greater than the absorption of light in the usual type of screen.

Where back projection is desirable that is, where the projection apparatus is placed on the opposite side of the screen from the spectators the present invention is also of importance. The translucency of the screen may be very definitely and positively controlled and governed by suitably regulating the milkiness of the beads used in making up the screen. This control of the milkiness and consequently the translucency of the bead permits of the transmission through the screen of any predetermined quantity of light, thus any predetermined illumination of the projected picture may be obtained. This result is obtained without any loss of the sound transmission quality of the screen.

The translucent screen when made up of ruby or other suitable beads may be advantageously used as a means of lighting the dark rooms used in developing and treating photographic materials which are injured by ordinary light. Thus by placing such a screen at an opening in one side of a dark room of this nature the injurious rays of light are cut off and at the same time adequate ventilation is obtained directly through the porous screen itself.

When used as a motion picture screen the screen of the invention has many desirable features which the heretofore customary screens do not afford, as, for instance, in the projection of colored or tinted pictures the beauty of the transmitted or reflected colors is much enhanced over the heretofore customary methods due to the nature of bead material.

I do not intend to confine myself to the particular forms or arrangements that are shown in the accompanying drawings. These merely illustrate methods of arranging the relative position of the beads. It will be understood that a different arrangement of beads or a different combination of wire mesh fabric and beads may be used without departing from the spirit of the invention. The beads may be disposed upon the fabric in any suitable manner and in any grouping arrangement which may seem best suited to existing conditions without departing from the spirit of the invention. Under certain circumstances and conditions it may be found desirable to eliminate entirely the intermediate layers of wire mesh fabric employing only the two outer wire mesh fabrics thus making desirable the use of but a single size of bead. Each of these arrangements permits of the free passage of sound waves or air through the screen by means of the interstices between the beads.

I claim:

1. The method of making screens for projected pictures which comprises arranging beads in layers, superimposing said layers of beads so that the beads of each succeeding layer cover the interstices of the preceding layer, and fixing the said layers in said relation to each other.

2. The method of making screens for projected pictures which comprises arranging opaque beads in layers, superimposing said layers of opaque beads so that the beads of each succeeding layer cover the interstices of the preceding layer, and fixing the said layers in said relation to each other.

3. A screen for projecting pictures comprising a plurality of layers of beads, means for maintaining the beads of each layer in a predetermined fixed relation to each other, means for securing said layers together with the beads of adjacent layers staggered with respect to one another so that air and air borne sound waves may be transmitted through the screen in the interstices between the said beads and at the same time provide a surface which will project the entire area of the picture.

4. A screen for projecting pictures comprising a plurality of layers of beads, the beads of adjacent layers being in contact with one another, means for maintaining the beads of each layer in a predetermined fixed relation to each other, the beads in one layer overlying the interstices in another layer so as to obstruct the direct passage of light through the screen but providing circuitous passageways for air therethrough, and means for securing said layers of beads together in sheet formation.

5. A screen for projected pictures comprising a plurality of layers of beads, and a plurality of layers of mesh fabric, the mesh of the fabric being smaller than the size of the beads, and means for tying said layers of fabric together with a layer of beads between each two layers of fabric and with the beads of the rear layers staggered in relation to the beads of the front layer thereby providing a surface which will reflect the entire area of the picture and at the same time have circuitous sound passages therethrough.

6. A screen for projected pictures comprising a plurality of layers of beads, the beads of the innermost layer being closely positioned so as to substantially touch one another, and the beads of the other layer or layers being smaller than the beads of the innermost layer and spaced apart from one another suitably to cover the interstices of the beads of the innermost layer, and means for supporting said layers in fixed relation to each other so that air and air borne sound waves may be transmitted through the screen in the interstices between said beads and at the same time provide a surface which will project the entire area of the picture.

7. A screen for projected pictures comprising a plurality of sheets of fabric each having a layer of beads secured thereto, and means for securing said sheets together thus forming the said layer of beads into a unitary screen.

In testimony whereof I affix my signature.

ALBERT LOUIS RAVEN.